(12) United States Patent
Austermeier et al.

(10) Patent No.: US 10,773,842 B2
(45) Date of Patent: Sep. 15, 2020

(54) LABELING MACHINE AND METHOD OF PRODUCING MULTIPACKS

(71) Applicant: Multivac Marking & Inspection GmbH & Co. KG, Enger (DE)

(72) Inventors: Georg Austermeier, Hövelhof (DE); Hauke Friedhoff, Herford (DE)

(73) Assignee: Multivac Marking & Inspection GmbH & Co. KG, Enger (DE)

(*) Notice: Subject to any disclaimer, the term of this patent is extended or adjusted under 35 U.S.C. 154(b) by 302 days.

(21) Appl. No.: 15/639,448

(22) Filed: Jun. 30, 2017

(65) Prior Publication Data

US 2018/0002047 A1 Jan. 4, 2018

(30) Foreign Application Priority Data

Jul. 4, 2016 (DE) .......................... 10 2016 212 130

(51) Int. Cl.
| | |
|---|---|
| B65B 17/02 | (2006.01) |
| B65C 1/02 | (2006.01) |
| B65C 9/02 | (2006.01) |
| B65B 35/44 | (2006.01) |
| B65G 57/11 | (2006.01) |

(Continued)

(52) U.S. Cl.
CPC .............. *B65B 17/02* (2013.01); *B65B 13/02* (2013.01); *B65B 35/44* (2013.01); *B65B 35/50* (2013.01); *B65B 61/28* (2013.01); *B65B 65/003* (2013.01); *B65B 65/02* (2013.01); *B65C 1/02* (2013.01); *B65C 9/02* (2013.01); *B65G 57/11* (2013.01); *B65B 13/182* (2013.01); *B65C 2009/0059* (2013.01); *B65G 57/035* (2013.01)

(58) Field of Classification Search
None
See application file for complete search history.

(56) References Cited

U.S. PATENT DOCUMENTS

| | | | |
|---|---|---|---|
| 2,991,477 A | 7/1961 | Hoyle, Jr. et al. | |
| 5,127,209 A * | 7/1992 | Hunter | B65B 35/44 198/419.3 |

(Continued)

FOREIGN PATENT DOCUMENTS

| | | |
|---|---|---|
| DE | 9206560 U1 | 8/1992 |
| DE | 102012210329 A1 | 12/2013 |

(Continued)

*Primary Examiner* — Michelle Lopez
*Assistant Examiner* — Chinyere J Rushing-Tucker
(74) *Attorney, Agent, or Firm* — Husch Blackwell LLP (57) ABSTRACT

A labeling machine for producing respective multipacks, the multipacks comprising a group of products secured together by a label. The labeling machine includes a conveyor that comprises a conveyor module for forming a group of products from a plurality of individual products and for providing the group of products to a labeling process to produce a multipack of products. The labeling machine includes at least one labeler. The conveyor module comprises at least two conveying units which each conveying unit comprising at least one carrier. The movement of the conveying units may be individually controllable allowing two carriers on different conveying units to cooperate as a fixing unit. A method of producing respective multipacks, which each comprise a group of products, using the labeling machine is also provided.

18 Claims, 4 Drawing Sheets

(51) Int. Cl.
*B65B 13/02* (2006.01)
*B65B 35/50* (2006.01)
*B65B 61/28* (2006.01)
*B65B 65/00* (2006.01)
*B65B 65/02* (2006.01)
*B65G 57/03* (2006.01)
*B65C 9/00* (2006.01)
*B65B 13/18* (2006.01)

(56) References Cited

U.S. PATENT DOCUMENTS

| | | | |
|---|---|---|---|
| 5,473,862 A | 12/1995 | Brizzi et al. | |
| 5,772,391 A * | 6/1998 | Sjogren | B65H 29/003 198/470.1 |
| 6,925,784 B2 * | 8/2005 | Escobar | B65B 5/08 414/793.7 |
| 9,452,893 B1 * | 9/2016 | Fujihara | B65G 43/08 |
| 2002/0179502 A1 * | 12/2002 | Cerutti | B07C 3/02 209/583 |
| 2013/0026011 A1 * | 1/2013 | van de Loecht | B65G 54/02 198/800 |
| 2013/0149096 A1 * | 6/2013 | Dax | B65G 57/00 414/788.9 |
| 2015/0136564 A1 * | 5/2015 | Hurni | B65B 57/16 198/418 |
| 2016/0031573 A1 * | 2/2016 | Davis | B65B 35/36 53/147 |
| 2016/0114915 A1 * | 4/2016 | Piepenbrock | B65B 23/12 53/438 |
| 2016/0229567 A1 * | 8/2016 | Schmachtel | B65B 35/50 |

FOREIGN PATENT DOCUMENTS

| | | |
|---|---|---|
| EP | 0757958 A1 | 2/1997 |
| EP | 1232958 A1 | 8/2002 |
| EP | 0778203 B1 | 1/2003 |
| EP | 2799349 A1 | 11/2014 |

* cited by examiner

LABELING MACHINE AND METHOD OF PRODUCING MULTIPACKS

CROSS-REFERENCE TO RELATED APPLICATIONS

This Application claims priority to German Patent Application Number 10 2016 212 130.8 filed Jul. 4, 2016, to Georg Austeimeier and Hauke Friedhoff, currently pending, the entire disclosure of which is incorporated herein by reference.

FIELD OF THE INVENTION

The present invention relates to a labeling machine for producing and a method of producing respective multipacks, each multipack comprising a group of products.

Multipacks within the meaning of the present invention are pre-packed individual products grouped by at least one label so as to form a unit.

Individual products that can be processed into multipacks according to the present invention are in particular individual products comprising a package content consisting of a plurality of individual bodies, which are accommodated within a package of the individual product in an arbitrary, irregular arrangement relative to one another. The individual bodies may occupy, relative to one another, arbitrary positions within the package.

Individual products that can be processed into multipacks according to the present invention are, in particular, also individual products comprising a package content consisting of at least one body whose shape can easily be deformed by a force acting on the individual product from outside and/or which is easily displaceable within the packaging material.

Individual products that can be processed into multipacks according to the present invention are, in particular, also individual products comprising a package content consisting of at least one body whose volume is smaller than the actual Tillable packaging volume of the package, i.e. the body does not have a size imparting shape to the package.

The above defined preferred individual products, which can be used for producing multipacks within the framework of the present invention, are summarized in the following under the term "dimensionally unstable products".

In contrast to the above, the term "dimensionally stable products" will relate in the following to individual products comprising a package content consisting of a comparatively rigid body or of a system of individual rigid bodies which are fixedly arranged relative to one another and which, in common, have a fixed arrangement, the package content being substantially shape-determining for the package.

BACKGROUND OF THE INVENTION

EP 0 778 203 B1 discloses a device for forming groups of individual products, of a type which could also be used for producing multipacks. For this purpose, a compartmentalized conveyor belt is used, which comprises a row of compartments that extends in the transport direction and serves to accommodate individual packages. The compartmentalized conveyor belt comprises a toothed belt as well as drivers mounted on the latter at a fixed distance from one another and forming compartments. The respective compartments formed thus on the compartmentalized conveyor belt are precisely adjusted to the product dimensions of each individual product.

The above is disadvantageous insofar as the compartmentalized conveyor belt is only suitable for producing multipacks consisting of individual products with a dimensionally stable content, e.g. for producing multipacks of dimensionally stable sweets, in particular individual cookie products. In this case, the individual products themselves, which are disposed one on top of the other in the compartmentalized conveyor belt, can, due to their dimensionally stable content, provide a surface which is sufficiently stable and uniform as a counter bearing for applying a label thereto. This kind of labeling can, however, not be carried out by means of the compartmentalized conveyor belt when the products in question have a dimensionally unstable content, since, when loosely contained in the respective compartments of the compartmentalized conveyor belt, such products do not define a surface suitable as a counter bearing for affixing a label thereto. Hence, pressing the label against this kind of products would have the effect that the latter would be pushed away or compressed. As a consequence, the label cannot be affixed precisely.

SUMMARY OF THE INVENTION

It is the object of the present invention to provide a labeling machine as well as a method for improved production of multipacks, irrespectively of the products to be grouped.

This object is achieved by means of a labeling machine according to claim 1 as well as by means of a method according to the independent claim 14. Improved further developments of the invention are the subject matters of the subclaims.

The present invention relates to a labeling machine for producing respective multipacks, which each comprise a group of products, said multipacks consisting of pre-packed individual products grouped by at least one label so as to faun a unit.

The labeling machine according to the present invention includes a conveyor comprising a conveyor module for forming a group consisting of a predetermined plurality of products and for providing said group of products for a labeling process so as to produce a multipack. The labeling machine further includes at least one labeler, the conveyor module being configured to make the group of products available to the labeler for the labeling process.

According to the present invention, the conveyor module comprises at least two conveying units which each comprise at least one carrier, said conveying units being individually controllable such that two carriers belonging to different conveying units cooperate as a fixing unit so as to provide the group of products for the labeling process.

In the case of the present invention, the respective carriers of the conveying units interact in that the conveying units are controlled separately so as to form the group of products and fix the products for the labeling process. The modularized structural design of the conveyor module allows a functional cooperation of the respective carriers so that the latter can accurately cooperate in spite of the fact that they belong to different conveying units. The conveyor module can easily, preferably automatically be adapted to an arbitrary operation with different multipacks, without performing time-consuming and costly resetting operations on the conveyor module.

The labeling machine according to the present invention may be particularly suitable for producing multipacks from individual products having a dimensionally unstable content, in particular for producing multipacks from dimensionally unstable sweets. By compressing the products stacked between the carriers, the contents of said products can be leveled out by a form fit from one product to the next in such a way that, in total, a stable stack can be made available to the labeler, whereby a stable surface may be established especially along at least one side of the stacked products provided for pressing on the label, said stable surface being available as a counter bearing for an accurate labeling process. The label can be pressed onto said surface accurately and stably.

By compressing the respective products stacked between the carriers, said products can be fixed for the labeling process and form thus a stable surface for pressing on the label for the production of a multipack. This principle can be applied for the production of multipacks making use of products having a dimensionally stable content as well as products having a dimensionally unstable content, so that the labeling machine according to the present invention may be suitable for flexible use, irrespectively of the type of products to be grouped.

According to the present invention, the conveyor module does not have provided thereon a fixed arrangement of individual compartments formed for receiving therein individual products, since the respective conveying units are configured for independent operation, so that the respective carriers provided thereon are able to cooperate arbitrarily as a reception unit for stacking the group and as a fixing unit for the labeling process. This means that, in the case of the present invention, the carriers of respective conveying units interact such that, together, they form suitable means for receiving as well as fixing the products, in spite of the fact that separate conveying units are provided.

By controlling the respective conveying units in a suitable manner, multipacks of varying stack sizes can be produced. Even if the individual products have different volumes, this will be no problem for the adaptable conveyor module according to the present invention, since the conveyor module may be configured for flexible operation. In addition, the operation of the conveyor module can be adapted precisely to the operation of feed devices and/or discharge devices provided therefor. Taking all this into account, the conveyor module is, due to its autonomous conveying units, particularly adaptable with respect to a number of products to be grouped as well as with respect to the content of the said products and can excellently be integrated in the operation of an extended conveyor system.

Due to the modularized structural design of the conveyor module used for the present invention, the conveyor module can easily be extended and can be used in different types of labeling machines without any difficulty.

Preferably, the two carriers cooperate as parallel grippers and are configured to hold together the group of products by forced pairing for providing the group of products for the labeling process. Thus, the products can be prevented from shifting in the fixing unit defined by the two carriers during the labeling process.

For providing the group of products for the labeling process, a first distance existing between the carriers during operation of the conveying units can, when the products have been accommodated, preferably be reduced to a second distance in such a way that holding of the group of products between the carriers can be accomplished by applying pressure to the group of products. Especially in the case of dimensionally unstable products, the contents of the latter can thus mutually level out and a surface suitable for fixing the label can form thereon. Preferably, the second distance, which may be adjusted for applying pressure to the group of products, can be accomplished in that at least one of the conveying units is/are controllable for accelerated or decelerated operation relative to another one of the conveying units.

Preferably, the group of products provided for the labeling process may be fixed between two carriers according to the present invention. The respective contents of the superimposed products can thus be pressed against one another between these carriers. Hence, the products will mutually stabilize one another to a sufficient extent. In particular in the case of products having a dimensionally unstable package content, the respective contents can level out from one product to the next, whereby the stacked products, when seen in total as a package, will be dimensionally stable and will thus allow accurate labeling thereon.

According to a preferred embodiment, the carriers of the respective conveying units are secured to the conveying units such that, when seen in the conveying direction of the conveyor module, they can be positioned in an aligned mode of arrangement, one on top of the other, along one of the conveying units. The carriers can thus cooperate as a fixing unit in a particularly effective manner. To this end, individual carriers may be fixed to the respective conveying units, e.g. by means of projecting spacing strips, so that, when seen in the conveying direction of the conveyor module, they can be positioned relative to one another one on top of the other along one of the conveying units.

Preferably, the conveying units are arranged side-by-side relative to one another, respective conveying directions of the conveying units for conveying the group of products being parallel to one another. This arrangement has a compact overall size and offers technical advantages, in particular as regards the control of the respective conveying units for receiving and fixing the group of products. In addition, the respective carriers of the conveying units can, along the parallel conveying directions, be effectively controlled relative to one another so as to form a reception unit for the group of products as well as a fixing unit. The conveying units, which are operated in parallel, will here so to speak cooperate as a group-like module.

The labeling machine will be particularly efficient, when the conveyor module comprises a further, third conveying unit including at least one carrier, a conveying direction of the third conveying unit being parallel to the respective conveying directions of the other conveying units. The throughput of the multipacks produced can thus be increased substantially, since, in particular according to this embodiment, the conveyor module will be able to faun, at least partially simultaneously, a new group of products while a group of products may be being provided for the labeling process. This allows a continuous production process.

According to an embodiment of the present invention, the labeling machine comprises a control device configured to control the conveying units independently of one another. This means that the individual speeds and/or accelerations of the conveying units can be controlled individually, so that the carriers positioned on said conveying units can be controlled relative to one another in a coordinated manner for forming the group of products and for making the group of products available for the labeling process. The control device can easily be functionally incorporated into at least one control circuit of the labeling machine, so that the operation of the labeling machine can take place automatically.

Preferably, the conveyor module has formed thereon a force limiting unit on the basis of which the predetermined force for compressing the products can be adjusted. The control device may be configured such that, when the predetermined force has been reached, the carriers used in this context are moved on at the same speed until labeling has taken place.

Preferably, the conveying units each comprise two carriers. The production rate can be increased in this way. The carriers may releasably be fixed to the respective conveying units. In the conveyor module, the respective carriers define so to speak flying teammates among one another. In the technical sense of the present invention this means that they can again and again cooperate in new, different constellations.

According to an advantageous embodiment, the conveying units each comprise an endless toothed belt as well as a pair of guide rollers for tensioning and guiding the respective toothed belts. The guide rollers in question may have common axes of rotation, so that, when seen side-by-side in the module, the respective conveying units will have similar conveying paths. In view of their structurally similar design, the conveying units in question can be produced at a reasonable price and they offer an advantageous basis for service and/or cleaning purposes.

Preferably, each of the conveying units of the conveyor module comprises a servomotor of its own. The respective conveying units can thus be adjusted autonomously. The servomotors may be arranged in close vicinity to the guide rollers of the conveying units, thus allowing a compact structural design of the conveyor module within the labeling machine.

According to an advantageous embodiment, the conveyor module may be arranged at an oblique angle, so that, when seen in a vertical projection plane, the respective conveying directions of the conveying units form an acute angle relative to the horizontal. The acute angle may be in particular an angle between 60° and 80°. This offers advantages especially as regards the reception and grouping of the products on the conveyor module, since it is thus possible to feed, at high speed, individual products from a feed device to the carrier carrying the group, without the products dropping from the carrier. An oblique position of the conveyor module also offers additional support for the group of superimposed products on the path to the labeler. It would also be advantageous if the conveyor module and the labeler were coupled, whereby a reorientation of the conveyor module would simultaneously cause a corresponding reorientation of the labeler, so that the labeler would maintain a predetermined position relative to the groups of products supplied thereto.

Preferably, the conveyor comprises a feed belt for feeding the products to the conveyor module and/or a discharge belt for transporting away the finished multipacks. Preferably, the feed belt may be arranged in a horizontal orientation and configured to transfer individual products to the conveyor module at a transfer area formed between the conveyor module and an end of the feed belt facing said conveyor module. Preferably, the discharge belt may be arranged below the conveyor module such that it may be displaced in parallel to the feed belt.

According to an embodiment variant, a lower deflection area of the conveyor module is, at least section wise, positioned above the discharge belt, when seen in a horizontal projection plane. Thus, it can be guaranteed that a produced multipack will automatically drop onto the discharge belt when passing through the lower deflection area of the conveyor module, and can be transported away by said discharge belt. The carriers holding the multipack may here automatically open when they pass through the lower deflection area, so that the multipack can be released for dropping onto the discharge belt. Alternatively or additionally, the discharge belt may also be replaced by a chute, which may be positioned below the conveyor module and which guides the finished multipacks to a downstream conveyor belt or directly into a cardboard box.

According to one variant, a guide unit is, at least section wise, arranged along the conveyor module for guiding the products. Preferably, the guide unit may be fixed to an end of the feed belt facing the conveyor module. According to a preferred embodiment, the guide unit comprises two guide rails arranged in the conveying direction of the conveyor module and extending in parallel. The group of products can here be conveyed between the guide rails to the labeler. Hence, the superimposed products can be prevented from slipping sideways out of the fixing unit before the labeling process.

Preferably, the feed belt has associated therewith a light barrier whose use guarantees that the products provided individually on the feed belt will properly be transferred to the conveyor module. The light barrier may be preferably arranged at an end of the feed belt facing the conveyor module, so as to individually detect products arriving there in order to allow the conveying units to be controlled accordingly.

The present invention additionally relates to a method of producing respective multipacks, which each comprise a group of products, by means of a labeling machine. According to the method disclosed by the present invention, a group may be formed from a predetermined plurality of products by means of a conveyor module and may be then provided, by means of the conveyor module, for a labeling process so as to produce a multipack, a plurality of conveying units of the conveyor module being individually controlled such that two carriers belonging to different conveying units cooperate as a fixing unit for providing the group of products for the labeling process.

Preferably, the two carriers grasp the group of products by means of force pairing, so that a dimensionally unstable content can level out by a form fit from one product to the next, whereby the products within the group will mutually stabilize one another. Thus, the respective products stacked one on top of the other within the group can faun a sufficiently stable surface as a counter bearing for a press-on force applied for fixing the label, so that it will be possible to fasten the label thereon accurately and reliably for fainting the multipack.

Preferably, the conveying units are controlled such that, for providing the group of products for the labeling process, a first distance existing between the carriers during operation of the conveying units can, when the products have been accommodated, be reduced to a second distance in such a way that holding of the group of products between the carriers may be accomplished by applying pressure to the group of products. Thus, the contents of the respective products can, especially in the case of dimensionally unstable products, be leveled out and a suitable surface for fixing the label can be formed.

Preferably, the individual products, which have a dimensionally unstable content and which are stacked between the two carriers one on top of the other and in contact with one another are compressed by the two carriers such that, due to the compression of the group of products, the dimensionally unstable content of the latter will be leveled out from one product to the next by means of a form fit, so that the products will mutually stabilize one another within the group. The label for producing a multipack can thus be pressed onto the group of products in a sufficiently strong and accurate manner.

For a particularly high throughput of multipacks to be produced, at least three conveying units are used in the conveyor module and controlled individually, so that, especially in the case of this embodiment, the formation of a group of products can take place at least partially simultaneously with the labeling process of a preceding group.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to the following drawings, in which the individual figures show.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
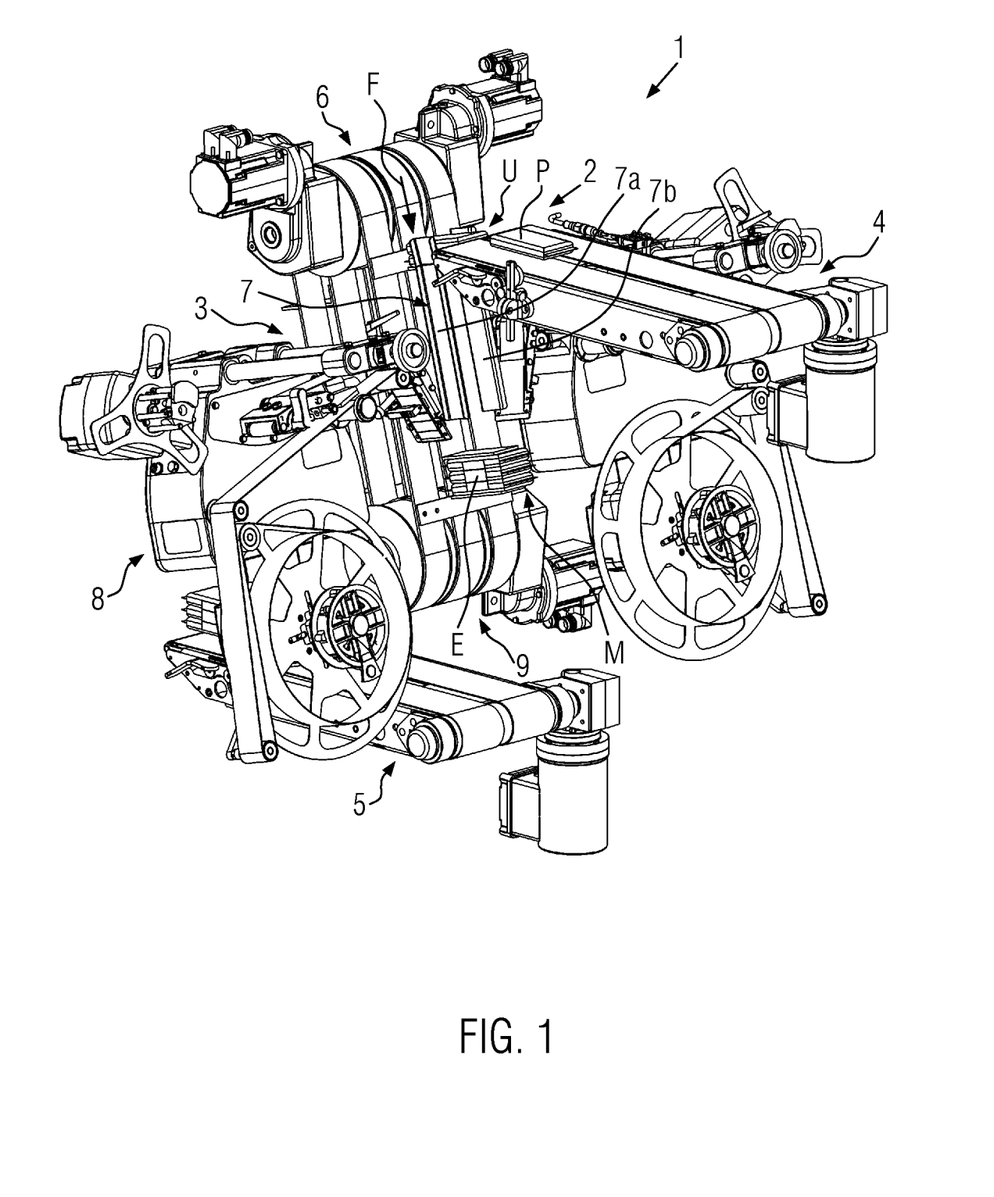
FIG. 1 is a perspective view of one embodiment of a labeling machine according to the present invention, without a machine casing, for producing multipacks in accordance with the teachings of the present disclosure.

FIG. 1 shows a labeling machine 1 for producing respective multipacks M comprising each a group of products P. For a better representation of this embodiment, the labeling machine 1 is shown without a machine casing.

The labeling machine 1 includes a conveyor 2 comprising a conveyor module 3, a feed belt 4 and a discharge belt 5. The conveyor module 3, the feed belt 4 and the discharge belt 5 have different conveying directions, a conveying direction of the feed belt 4 being displaced in parallel relative to a conveying direction of the discharge belt 5. The conveyor module 3 has a conveying direction F converging at an acute angle with the respective conveying directions of the feed belt 4 and of the discharge belt 5. The conveyor 2 thus defines a step, when seen as an overall conveying path.

Between an upper deflection area 6 of the conveyor module 3 and an end of the feed belt 4 facing the conveyor module 3 a transfer area U for stacking individual products P is formed. In said transfer area U, the products P are transferred individually from the feed belt 4 to the conveyor module 3. The formation of the group of products P will be explained in more detail hereinafter in connection with FIGS. 2 to 4.

Furthermore, FIG. 1 shows a guide unit 7 which is arranged along the conveyor module 3. The guide unit 7 is fixed to the end of the feed belt 4 facing the conveyor module 3, but oriented along the conveying direction F of the conveyor module 3. According to FIG. 1, the guide unit 7 comprises a pair of rails 7a, 7b arranged in the conveying direction F and extending in parallel. Between this pair of rails 7a, 7b, a group of products P can be guided to a labeler 8 of the labeling machine 1. The labeler 8 is configured to apply at least one label E to the group of products P so as to produce the multipack M.

FIG. 1 also shows that a lower deflection area 9 of the conveyor module 3 is positioned above a rear section of the discharge belt 5. Hence, a multipack M produced can accurately drop onto the discharge belt 5 when running through the lower deflection area 9.

Figure 2:
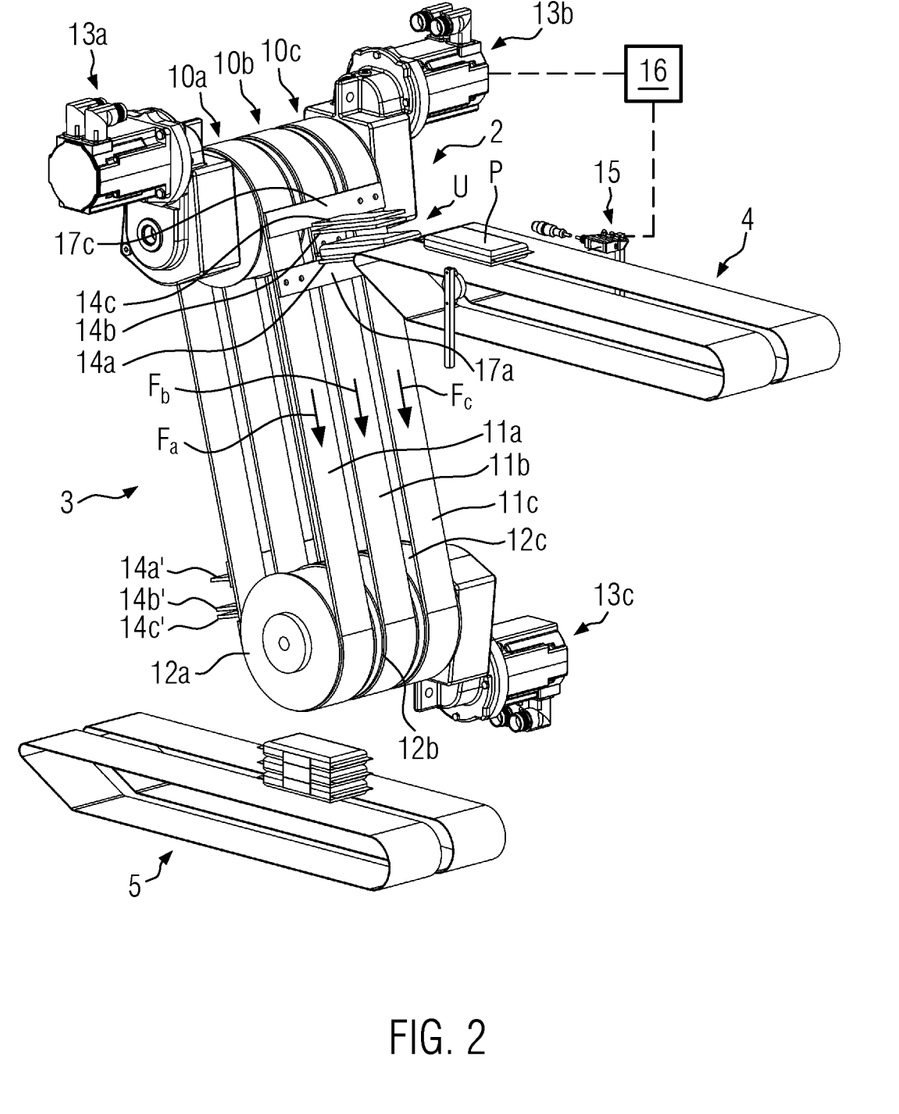
FIG. 2 is a perspective view of the conveyor module of the labeling machine of FIG. 1 during the foil cation of a group of products in accordance with the teachings of the present disclosure.

FIG. 2 shows the conveyor module 3, the feed belt 4 and the discharge belt 5 in common in an isolated representation. The conveyor module 3 comprises three conveying units 10a, b, c arranged side-by-side relative to one another, respective conveying directions Fa, b, c of the conveying units 10a, b, c for conveying the group of products P being parallel to one another.

The conveying units 10a, b, c each comprise an endless toothed belt 11a, b, c as well as a pair of guide rollers 12a, b, c for tensioning and guiding the respective toothed belt 11a, b, c.

According to FIG. 2, the conveyor module 3 comprises for each of the conveying units 10a, b, c a respective servomotor 13a, b, c. The functional positioning of the respective servomotors 13a, b, c according to FIG. 2 may, however, be changed. Depending on the machine construction, it would also be imaginable to arrange two of the servomotors 13a, b, c in the lower deflection area 9.

FIG. 2 also shows that three carriers 14a, b, c are positioned one above the other at the transfer area U. The carriers 14a, b, c are fixed to the respective toothed belts 11a, b, c. The carriers 14a, c are fixed to the respective toothed belts 11a, c by means of spacing strips 17a, c. Thus, the carriers 14a, c, together with the carrier 14b, are positioned in an aligned mode of arrangement, one on top of the other, along the conveying direction Fb of the conveying unit 10b arranged between the conveying units 10a, c. Furthermore, FIG. 2 shows that respective additional carriers 14a', b', c' are available on the back of the conveyor module 3.

At the transfer area U, the two carriers 14a, b define a reception unit for receiving therebetween a group consisting of a predetermined plurality of products P for the production process of a multipack M.

In addition, FIG. 2 shows a light barrier 15 arranged at the end of the feed belt 4 for detecting individual products P. A component shown only schematically in FIG. 2 is a control device 16 of the labeling machine 1, which is functionally connected to the light barrier 15 as well as to the respective servomotors 13a, b, c of the conveyor module 3. For controlling respective speeds and/or accelerations of the individual conveying units 10*a*, *b*, *c*, additional non-shown sensor units may be provided on the labeling machine 1, said sensor units being functionally connected to the control device 16. The control device 16 is configured for controlling an operation of the conveyor module 3 as such as well as for adapting said operation of the conveyor module 3 in particular to an operation of the feed belt 4 and to an operation of the labeler 8 (cf. FIG. 1) in such a way that the formation of the group of products P as well as the provision of the latter for the labelling process can take place quickly and preferably continuously.

Figure 3:
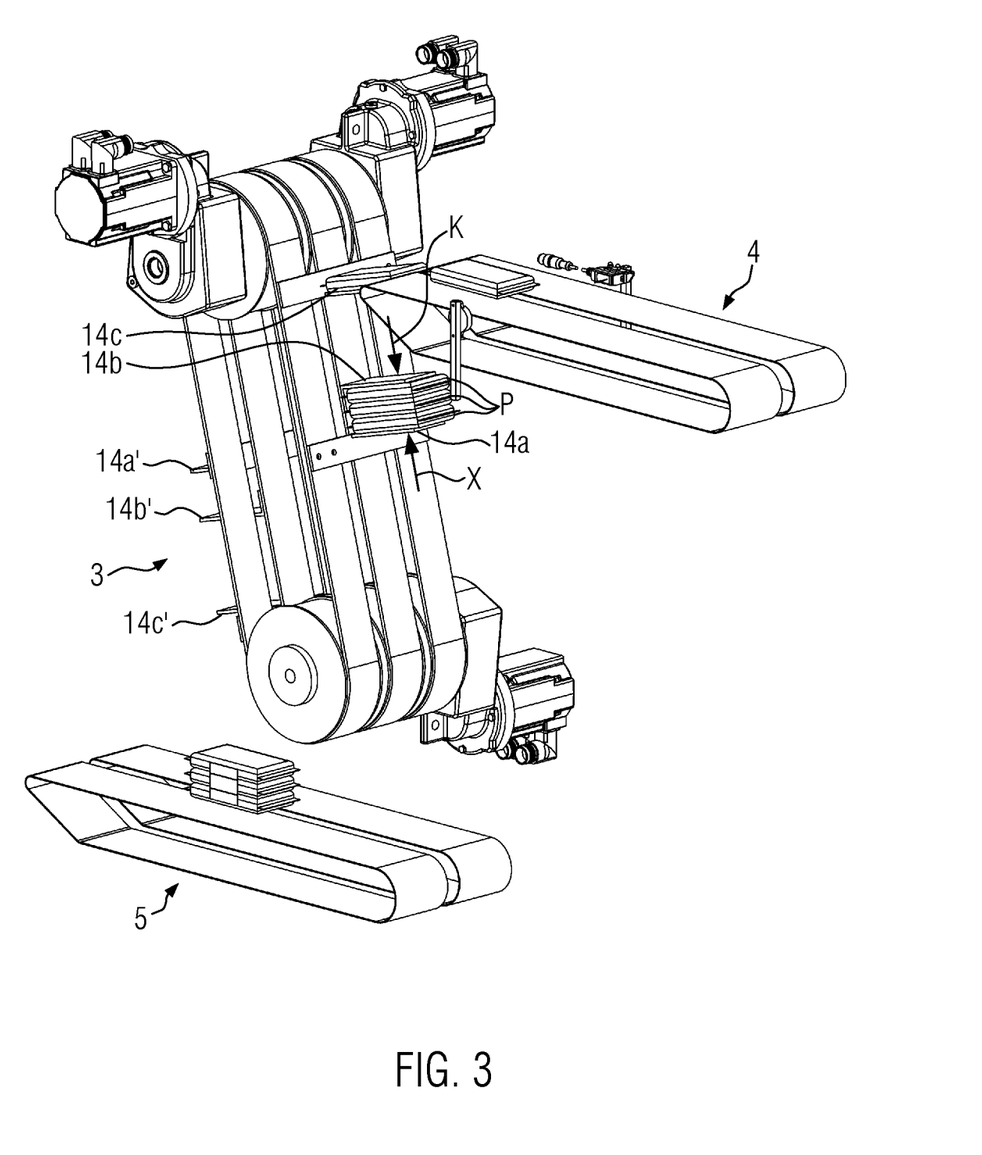
FIG. 3 is a perspective view of the conveyor module of FIG. 2 during fixing of the group of products for a labeling process in accordance with the teachings of the present disclosure.

FIG. 3 shows the conveyor module 3 with a group of three individual products P, which are accommodated between the carriers 14*a*, *b* and stacked in mutual contact with one another. The third carrier 14*c* remained in the transfer area U so as to be there available for foaming a new group of products P.

According to FIG. 3, the two conveying units 10*a*, *b* are controlled such that the two carriers 14*a*, *b* compress, by means of a predetermined pressure K, the products P stacked therebetween. To this end, preferably the upper one of the two carriers 14*a*, *b* applies pressure in the direction of the lower carrier 14*a*. The products P located between the carriers 14*a*, *b* can thus be compressed and simultaneously fixed between the carriers 14*a*, *b* for a subsequent labeling process on the labeler 8, since, after having received the products P between them, the carriers 14*a*, *b* are displaced from a first distance existing therebetween during operation of the conveying units 10*a*, *b* in such a way that a second distance x will be established between them.

In the event that the respective products P have a dimensionally unstable, i.e. irregular package content, the respective contents can level out by a form fit from one product to the next established by compressing the carriers 14*a*, *b*, whereby a stable surface O shown in the image plane of FIG. 3 is available for the labeling process. The surface O is substantially planar and offers a sufficiently large surface for affixing the label E.

FIG. 3 also shows that the carriers 14*a'*, *b'*, *c'* fixed in position on the back of the conveyor module 3 are, at the moment in question, positioned in a mirror-inverted manner in comparison with the carriers 14*a*, *b*, *c* arranged on the front of the conveyor module 3.

Figure 4:
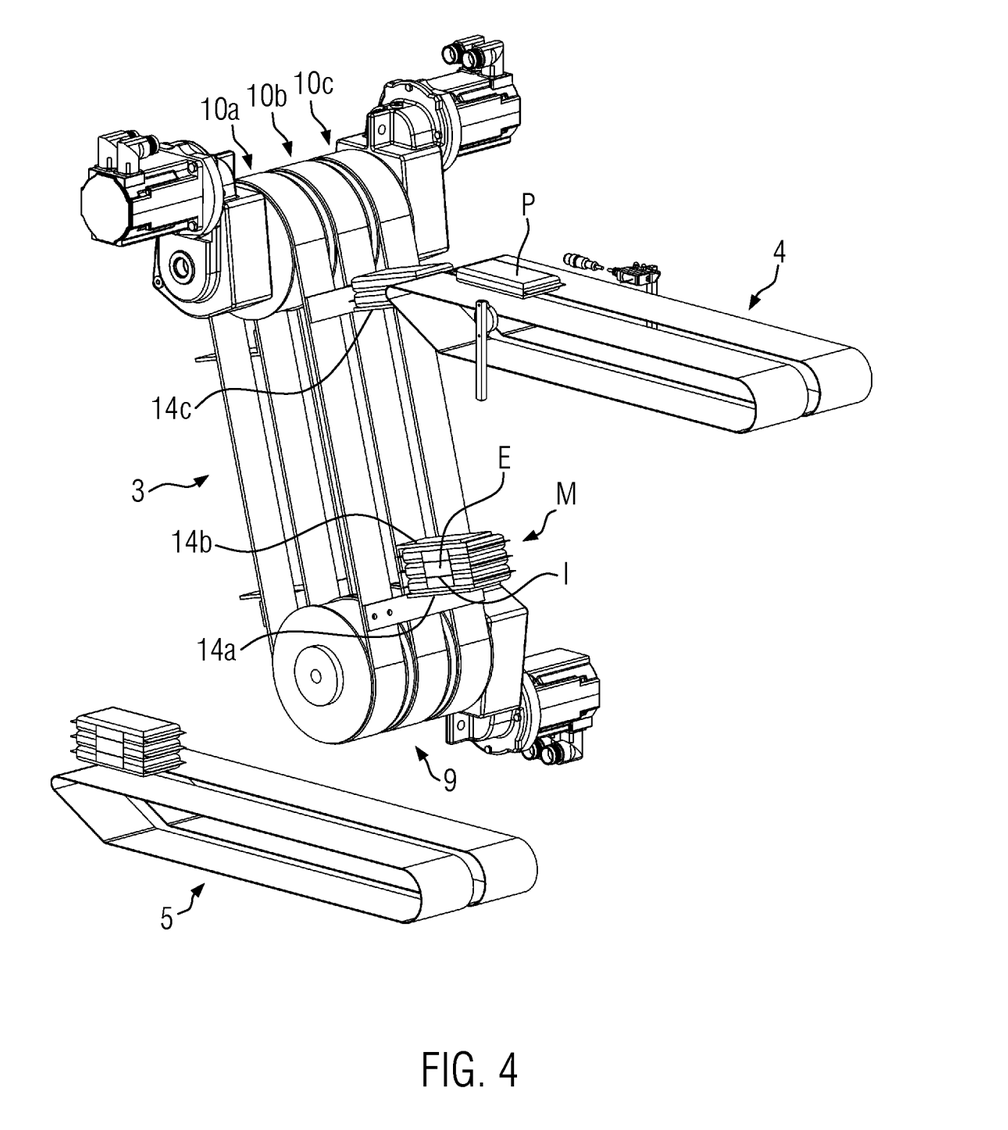
FIG. 4 is a perspective view of the conveyor module of FIG. 2 with a multipack produced thereon in accordance with the teachings of the present disclosure.

FIG. 4 shows the conveyor module 3 with a multipack M that has been finished thereon, said multipack M consisting of three individual products P which are connected to one another by the label E (such a label E has preferably also been applied to the opposite side of the stack) so as to faund a unit. The label E, which interconnects the individual products P, may comprise at least one perforation 1. In addition, FIG. 4 shows that the third carrier 14*c* is still available in the transfer area U for receiving thereon individual products P so as to form a new group of products P. In comparison with FIG. 3, said third carrier 14*c* has already positioned thereon two individual products P.

A method of producing respective multipacks M comprising each a group of products P will be explained hereinafter making reference to FIGS. 2 to 4.

Quite generally, a group comprising a predetermined plurality of products P is first established by means of the conveyor module 3 for producing a multipack M according to FIGS. 2 to 4. Afterwards, the group of products P is fixed for a subsequent labeling process. To this end, the group of products P is compressed, whereby, especially in the case of products P having a dimensionally unstable package content, a form fit is established between the products P stacked one on top of the other in mutual contact with one another, since the dimensionally unstable package contents contained therein will level out one another. Due to the compression of the products P, said products P can be fixed and they can form the stable press-on surface O (cf. FIG. 3) on a side of the group of products P facing the labeler 8 (cf. FIG. 1). The group of products P remains compressed until it has passed the labeler 8, so that the labeler 8 will be able to accurately and stationarily label the group of products P passing therethrough.

According to the present invention, each of the respective conveying units 10*a*, *b*, *c* is controlled separately by the servomotor 13*a*, *b*, *c* in question. How the conveying units 10*a*, *b*, *c* can be controlled in detail will be described hereinafter.

FIG. 2 shows that, in the transfer area U, the carrier 14*a* occupies a first reception position at which a first product P has been deposited thereon. The carrier 14*a* moves from the first reception position downwards by one step width to a second reception position shown in FIG. 4, so that a further product P can be deposited on the previously deposited product P. The operation of the feed belt 4 depends here on the operation of the conveying unit 10*a*. The stepwise displacement of the carrier 14*a* can be triggered by the light barrier 15 arranged at the end of the feed belt 4. The stepwise displacement of the carrier 14*a* is repeated until the group of products P is complete. In the present example it is repeated three times until a total of three products P has been deposited on the carrier 14*a*.

According to FIG. 2, the other two carriers 14*b,c* are positioned at a standby position above the carrier 14*a* carrying the group of products P, such that they do not interfere with the process for forming the group of products P. The carriers 14*b,c* remain at this position until the group on the carrier 14*a* has been completed. When this is the case, the carrier 14*b* will move downwards so as to fix from above the group of products P placed on the carrier 14*a*, e.g. in that it applies a predetermined, adjustable force K to the group of products P from above or in that the carriers 14*a*, 14*b* are moved towards one another until a reduced, adjustably predetermined distance exists therebetween, so that the stable surface O will be established for the subsequent labeling process.

In the meantime, the third carrier 14*c* moves to the first reception position, so that a new group of products P can be formed thereon. The carrier 14*c* is then displaced incrementally, as has been explained hereinbefore in connection with the carrier 14*a*, so as to form the new group of products P.

Making reference to FIG. 3, the complete group of products P is compressed between the carriers 14*a*, *b* for the subsequent labeling process for producing the multipack M. Further up, a new group of products P is formed on the carrier 14*c*, independently of the operation of the carriers 14*a*, *b*.

FIG. 4 shows the finished multipack M after the labeling process. The multipack M is still held between the carriers 14*a*, *b* on the conveyor module 3. In the deflection area 9 above the discharge belt 5, the fixing established by the carriers 14*a*, *b* opens automatically in that the latter move apart, so that the finished multipack M drops from the conveyor module 3 onto the discharge belt 5 positioned therebelow and can be transported away.

When a finished multipack M has been transferred from the conveyor module 3 to the discharge belt 5, the respective conveying units 10*a*, *b* can be controlled such that the carriers 14*a',b'*, fixed in position on the back of the conveyor module 3 in FIG. 3 move up to the standby position in the transfer area U for the new stacking process, so as to be available for the production process of a new multipack M. To this end, the carriers 14a', c cooperate for forming and providing the new group of products P, while the carrier 14b' is available for forming a subsequent new stack.

In principle, the functional principle of the carriers 14a, a', b, b', c, c' according to FIGS. 2 to 4 can be described as follows herein below.

The respective conveying units 10a, b, c are controlled such that: (a) for forming the group of products P, one of the carriers 14a, b, c is incrementally moved downwards from a first reception position in accordance with the number of products P for the multipack M to be produced; (b) when the group on the carrier 14a has been completed, a subsequent carrier 14b catches up with the group and applies pressure onto the group of products P from above, so that said products P are compressed and fixed between the two carriers 14a, b; (c) a further carrier 14c, which follows the carrier 14b applying pressure onto the group from above, moves to the first reception position so as to be available for the formation of a new group of products P; (d) the group of products P held together between the carriers 14a, b moves to the labeler 8, which applies the label E to the group of products to secure the group of products together, thus producing a multipack M, while the new group of products P is formed step-by-step on the carrier 14c; and (e) the multipack M is transferred from the conveyor module 3, thus allowing the two carriers 14a', b' to move up to the standby position in the transfer area U, the carrier 14a ' interacting with the carrier 14c for compressing and fixing the new group of products P as soon as the new group of products P formed therebetween has been completed, and the carrier 14b' moving to the first reception position so as to form a further new group of products P, when the carriers 14c, 14a' have been moved away from the transfer area U in the direction of the labeler 8.

The above steps can be repeated an arbitrary number of times, so that multipacks M will be produced continuously.

The device according to the present invention as well as the method according to the present invention can be used in a very flexible manner. In particular, they can be used for precisely grouping products having a dimensionally stable content as well as products having a dimensionally unstable content so as to form multipacks M. In addition, in the case of products P changing in size, resetting operations on the conveyor module 3 will not be necessary for the production of the multipacks M. Furthermore, arbitrary stack sizes can be produced for the multipacks M.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The ten is "having" and "including" and similar term's as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A labeling machine for producing respective multipacks, each multipack comprising a group of products, the labeling machine comprising:

a conveyor comprising a conveyor module capable to form a group of products comprising a predetermined plurality of individual products and capable to fix the position of said group of products for a labeling process to produce a multipack of said plurality of products;

wherein the labeling machine includes at least one labeler, the conveyor module being configured to make the group of products available to the labeler for the labeling process, wherein the at least one labeler is disposed within a conveying path of the conveyor;

wherein the conveyor module comprises at least two conveying units, each conveying unit comprises at least one carrier;

wherein the at least two conveying units are individually controllable such that two carriers belonging to different of said at least two conveying units cooperate as a fixing unit capable to fix the products for the labeling process for securing the group of products as the group of products is provided to the labeler; and wherein the at least one carrier of each of the at least two conveying units are moveable to cooperate as parallel grippers, and are operable to hold together the group of products by applying a force to said group of products to fix the individual products in said group of products while a label is being applied to said group of products.

2. The labeling machine according to claim 1, wherein when conveying the group of products for the labeling process, a first carrier of a first conveying unit and a second carrier of a second conveying unit are disposed relative to each other at a first distance during operation of the conveying units and are moveable to a second distance between the first carrier of the first conveying unit and the second carrier of the second conveying unit to hold the group of products between the carriers to apply the force to the group of products.

3. The labeling machine according to claim 1, wherein the at least two conveying units are disposed side-by-side relative to one another, and a first of the at least two conveying units is disposed for movement in a first conveying direction and a second of the at least two conveying units is disposed for movement in a second conveying direction wherein the first conveying direction and second conveying direction are parallel to each other.

4. The labeling machine according to claim 3, wherein the conveyor module further comprises a third conveying unit having at least one carrier, wherein the third conveying unit is disposed for movement in a third conveying direction, said third conveying direction being parallel to said first conveying direction and said second conveying direction.

5. The labeling machine according to claim 3, wherein the conveyor module is disposed at an oblique angle relative to horizontal, such that, when seen in a vertical projection plane, the first conveying direction and the second conveying direction of the at least two conveying units define an acute angle relative to horizontal.

6. The labeling machine according to claim 5, wherein the acute angle relative to horizontal is an angle between 60° and 80°.

7. The labeling machine according to claim 1 further comprising a control device in communication with the at least two conveying units to operate the at least two conveying units independently of one another.

8. The labeling machine according to claim 1, wherein each of the at least two conveying units having at least two carriers.

9. The labeling machine according to claim 1, wherein each of the at least two conveying units comprise an endless toothed belt and a pair of guide rollers for tensioning and guiding the endless toothed belt.

10. The labeling machine according to claim 9, wherein each of the at least two conveying units comprise a servomotor for driving said endless toothed belt.

11. The labeling machine according to claim 1, wherein the conveyor comprises one of a feed belt for feeding the plurality of individual products to the conveyor module, or a discharge belt for transporting away the produced multipack.

12. The labeling machine according to claim 1, wherein the conveyor comprises a discharge belt for transporting away the produced multipack and when seen in a horizontal projection plane, a lower deflection area of the conveyor module is disposed vertically above the discharge belt.

13. The labeling machine according to claim 1, wherein the conveyor module comprises a guide unit for guiding a movement of the group of products.

14. A method of producing multipacks, each multipack comprising a group of individual products, the said method comprising the following steps:
  forming a group of products from a predetermined number of a plurality of individual products using a conveyor module;
  grasping the group of products with a pressure force using a first carrier and a second carrier of the conveyor module;
  mutually stabilizing the individual products within the group of products through the grasping with the pressure force using the first carrier and the second carrier
  providing the group of products to a labeling process using the conveyor module while the first and the second carrier grasp the group of products with the pressure force; and
  producing a multipack of products by applying a label around all or part of the group of products while the first and the second carrier grasp the group of products with the pressure force;
  wherein the grasping the group of products step comprises individually controlling the respective movement of the first carrier disposed on a first conveying unit and the second carrier on a second conveying unit of the conveyor module so the first carrier and the second carrier cooperate as a fixing unit for securing the group of products together and applying the pressure force to the group of products.

15. The method of claim 14 further comprising the step of leveling out dimensionally unstable content by a form fit from a first pre-packaged product of the plurality of individual pre-packaged products to a second pre-packaged product of the plurality of individual pre-packaged products using the pressure force applied during the grasping step.

16. The method of claim 14 further comprising the step of packaging the plurality of individual products prior to the step of providing the group of products to the labeling process using the conveyor module.

17. The method of claim 14 wherein the group of products comprises a plurality of individual pre-packaged products.

18. A labeling machine for producing respective multipacks of individual pre-packaged products, the labeling machine comprising:
  at least one labeler capable to affix at least one label to a plurality of individual pre-packaged products;
  a conveyor comprising at least a first conveying unit having a first carrier and a second conveying unit having a second carrier, wherein the at least two conveying units are capable to form a group of pre-packaged products comprising a predetermined number of the plurality of individual pre-packaged products;
  wherein the first conveying unit and the second conveying unit are independently moveable as to apply a compressive force on said group of pre-packaged products disposed between the first carrier and the second carrier, wherein said compressive force fixes a position of each pre-packaged product of said group of pre-packaged products on said conveyor while said group of pre-packaged products is moved by said conveyor in a conveying direction toward said at least one labeler; and
  wherein said at least one labeler is disposed on the labeling machine relative to said conveyor such that said at least one labeler affixes at least one label on said group of pre-packaged products fixed on the conveyor to form a multipack while said conveyors are applying the compressive force on said group of pre-packaged products, the multipack comprising said group of pre-packaged products connected together with the at least one label.

* * * * *